United States Patent [19]
Yoo

[11] Patent Number: 5,461,428
[45] Date of Patent: Oct. 24, 1995

[54] APPARATUS FOR DISPLAYING A BROADCASTING MODE DESIGNATION

[75] Inventor: Jaechern Yoo, Seoul, Rep. of Korea

[73] Assignee: Samsung Electronics Co., Ltd., Kyungki-Do, Rep. of Korea

[21] Appl. No.: 143,639

[22] Filed: Nov. 1, 1993

[30] Foreign Application Priority Data

Oct. 31, 1992 [KR] Rep. of Korea .................. 92-20462

[51] Int. Cl.$^6$ .............................. H04N 5/46; H04N 5/50
[52] U.S. Cl. ....................... 348/558; 348/556; 348/569
[58] Field of Search .................... 348/558, 555, 348/556, 553, 564, 569; H04N 5/46, 5/50

[56] References Cited

U.S. PATENT DOCUMENTS

| | | | |
|---|---|---|---|
| 4,716,589 | 12/1987 | Matsui | 348/485 |
| 4,729,012 | 3/1988 | Jose et al. | 348/556 |
| 4,962,428 | 10/1990 | Tong et al. | 348/555 |
| 5,132,793 | 7/1992 | Hirahata et al. | 348/556 |

FOREIGN PATENT DOCUMENTS 0143784 6/1990 Japan .................... 348/555

*Primary Examiner*—Victor R. Kostak
*Attorney, Agent, or Firm*—Sughrue, Mion, Zinn, Macpeak & Seas

[57] ABSTRACT

A broadcasting mode name display apparatus is disclosed. A broadcasting mode detector selects the broadcasting channel and detects the broadcasting mode of a video signal. A mode converter converts a conventional broadcasting mode into a high definition mode. If the mode converter receives a high definition mode signal instead, it is passed as it is. A recorder records the video signal, together with a mode identification signal representing the correspondingly detected broadcasting mode, on a recording medium. A reproducer and detector reproduces the video signal from the recording medium and simultaneously detects the mode identification signal. A switching portion selectively outputs the video signal from either the mode converter or the reproducer and detector according to a control signal. A microprocessor supplies the control signal, the value of which is based on the operation mode of the apparatus, to the switching portion. The microprocessor generates a further control signal representing the broadcasting mode of the video signal. An OSD block generates an OSD signal prompting display of the broadcasting mode on a display screen in response to receiving the further control signal of the microprocessor.

17 Claims, 5 Drawing Sheets

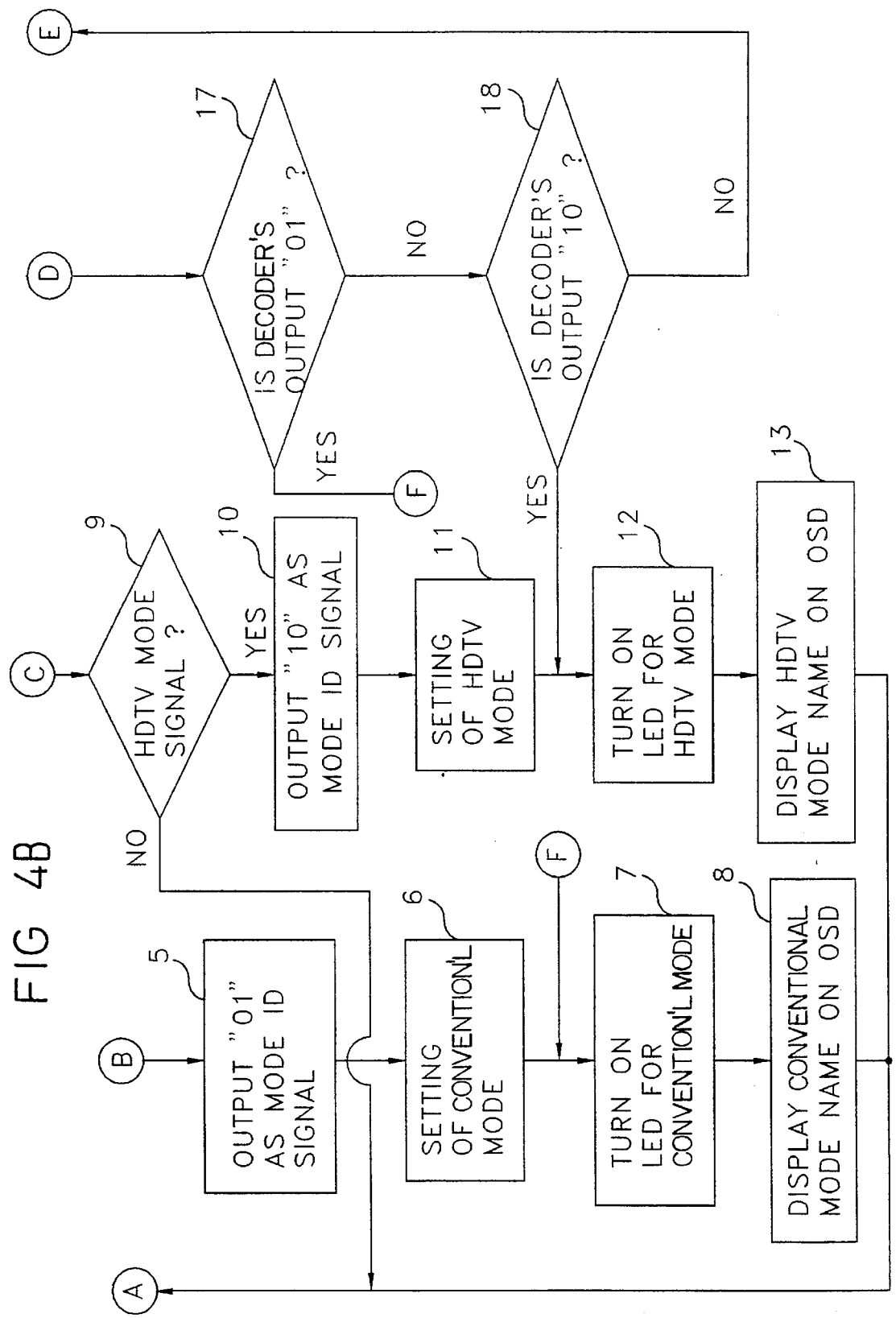

APPARATUS FOR DISPLAYING A BROADCASTING MODE DESIGNATION

BACKGROUND OF THE INVENTION

The present invention relates to a broadcasting mode designation display apparatus, and particularly to an apparatus for displaying a broadcasting mode designation of a broadcasting signal which is currently displayed on a screen.

Generally, conventional television lacks reality in the images which are displayed on the screen. Thus, a high definition television broadcasting method has recently been proposed for improving image reality. Particularly, the proposed high definition television (HDTV) broadcasting method can be rendered compatible with more conventional television (TV) broadcasting methods such as the NTSC broadcasting method. Thus, an HDTV receiver can display the more conventional TV signal. To receive the more conventional TV signal with an HDTV receiver, one channel is provided for transmitting the HDTV signal while another channel is provided for the conventional TV signal. Thus, the conventional TV signal received by the HDTV receiver can be displayed on a screen just like an HDTV broadcasting video signal. It is thus desirable that the user be able to discriminate whether the video signal currently displayed on the screen comes from an HDTV broadcasting signal or from a more conventional TV broadcasting signal.

SUMMARY OF THE INVENTION

It is an object of the present invention to provide an apparatus for displaying a broadcasting mode designation that is capable of informing a viewer of the broadcasting mode of the reception channel of the video signal being displayed, by detecting broadcasting mode information from the video signal and displaying the broadcasting mode information on the display video display screen.

It is another object of the present invention to provide an apparatus for displaying a broadcasting mode designation that is capable of informing a viewer of the broadcasting mode of a prerecorded video signal currently being displayed by recording both the video signal of a selected channel and broadcasting mode information for the video signal onto a recording medium, and by detecting the broadcasting mode information of the video signal during a reproduction (playback) operation and displaying the detected broadcasting mode information on the display screen.

To accomplish the above objects of the present invention, an apparatus is provided for displaying a broadcasting mode designation for use in a video device for displaying a video signal of a high definition television (HDTV) broadcasting mode and another video signal of a more conventional television (TV) broadcasting mode, both of which are input through reception channels. The apparatus includes: means for detecting a mode identification signal signifying whether an input video signal is in the HDTV broadcasting mode or the more conventional TV broadcasting mode; mode conversion means for converting the input video signal into a display video signal which can be displayed on a screen; display means for displaying the display video signal output from the mode conversion means; and means for processing the mode identification signal detected by the detection means and for controlling the display means to display the mode designation in conjunction with the video signal displayed on the display means.

There is further provided an apparatus for displaying a broadcasting mode designation for use in a video apparatus for recording and reproducing a video signal of a high definition television (HDTV) broadcasting mode and another video signal of a more conventional television (TV) broadcasting mode, both of which are input through reception channels. The apparatus comprises: first detection means for detecting a mode identification signal signifying whether an input video signal is in the HDTV broadcasting mode or in the more conventional TV broadcasting mode; mode conversion means for converting the input video signal into a processed video signal; recording means for receiving the processed video signal from the mode conversion means and for recording the received video signal together with a mode identification signal (detected by the first detection means) onto a recording medium; reproduction means for reading the recorded video signal from the recording medium; second detection means for detecting the mode identification signal from the read video signal; switching means for receiving the processed video signal and the read video signal from the mode conversion means and the second detection means, respectively, and selectively outputting one of these video signals in response to the reception at either a reception mode signal or a reproduction mode signal; display means for displaying the selected video signal output from the switching means; a microprocessor for generating a control signal controlling the display of the mode identification signal detected by the first and second detection means on the display means in correspondence with the selected video signal currently displayed on the display means; and means for receiving the control signal and processing the detected mode identification signal such that it can be displayed on the display means in accordance with the control signal.

DETAILED DESCRIPTION OF THE PREFERRED EMBODIMENTS

Preferred embodiments of the present invention will be described below with reference to the accompanying drawings.

Reception modes for receiving a video signal through a reception channel are classified into (i) a simultaneous-recordable reproduction mode for recording the received video signal and simultaneously displaying the signal on a screen, and (ii) a recording mode for only recording the received video signal without displaying it on the screen. However, only one embodiment in which a reproduction mode (PB) is selected for displaying a video signal previously recorded on a recording medium in a simultaneous-recordable mode ($\overline{EE}$), on a screen need be explained hereinbelow to convey the principles of the invention.

Figure 1A:
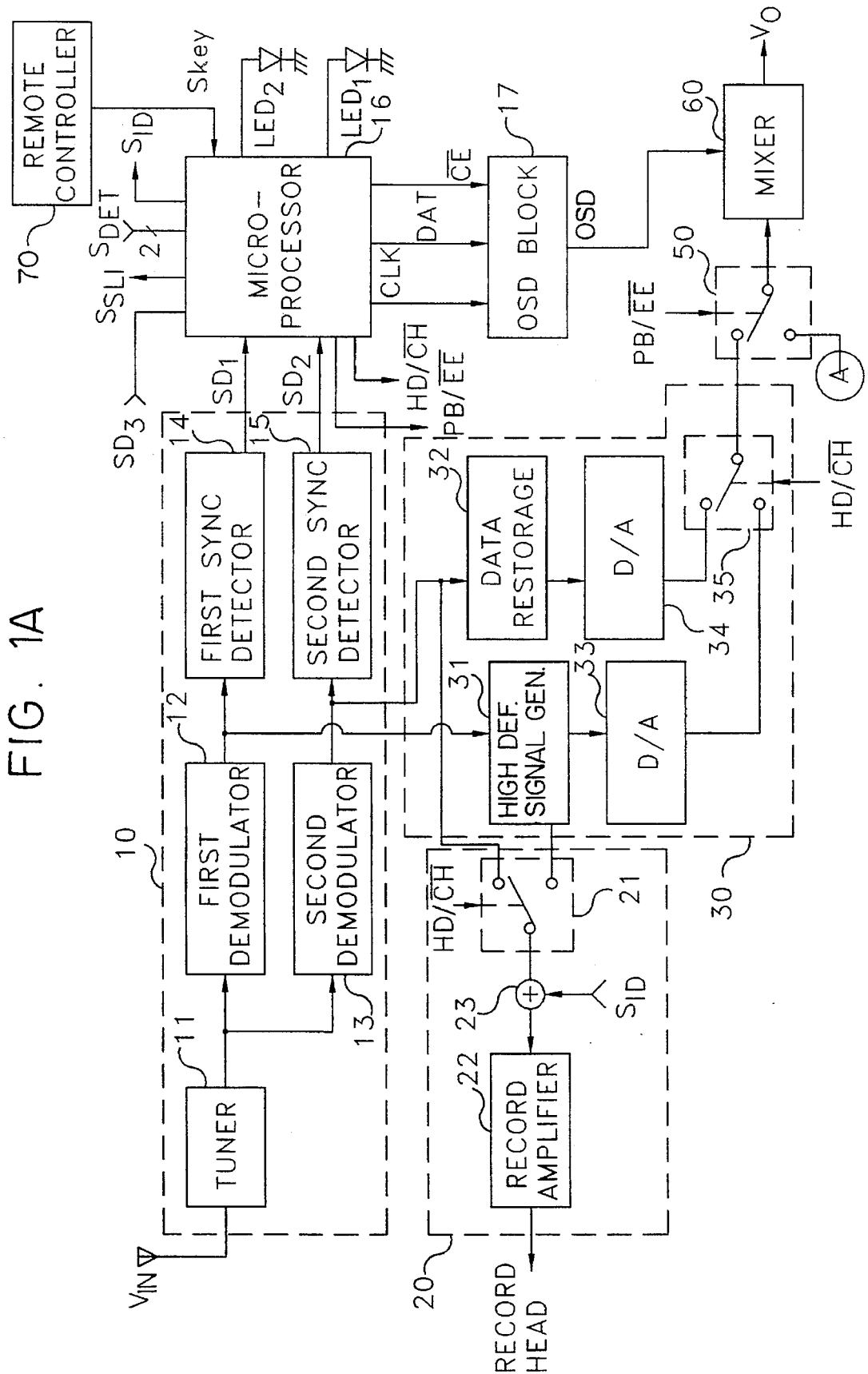
FIG. 1 is a block diagram of a broadcasting mode designation display apparatus and is subdivided into FIG. 1A and FIG. 1B.

FIG. 1 is a block diagram of a broadcasting mode designation display apparatus. In FIG. 1 a mode detector 10 for ascertaining broadcasting mode information from an input video signal $V_{IN}$ of a selected channel is connected to a mode converter 30 that, if necessary, converts the video signal output from the mode detector 10 into a video signal of a high definition television (HDTV) broadcasting mode. The mode converter 30 is connected to a recording block 20 which inserts the broadcasting mode information detected by the mode detector 10 into the video signal and records the combined signal on a recording medium. Also, the mode converter 30 is connected to one input of a switching portion 50. The switching portion 50 selects either a simultaneous-recordable mode (EE) for recording a received video signal and simultaneously displaying the signal on the screen, or a reproduction mode (PB) for displaying a signal already recorded on a recording medium on the screen. A reproduction and detection portion 40 for reproducing the recorded signal through the recording block 20 and detecting the broadcasting mode is connected to the other input of the switching portion 50.

The mode detector 10 comprises a tuner 11, first and second demodulators 12 and 13 and first and second sync detectors 14 and 15. The demodulators 12 and 13 receive the signal of the selected channel through the tuner 11 and demodulate the received signal. The first and second sync detectors 14 and 15 receive the signals demodulated from the first and second demodulators and detect sync signals $SD_1$ and $SD_2$. Signal output terminals of the first and second sync detectors 14 and 15 are connected to a microprocessor 16, which receives the sync signals $SD_1$ and $SD_2$ and generates a mode identification signal $S_{ID}$ for discriminating the broadcasting mode of the displayed video signal. In this embodiment, light emitting diodes $LED_1$ and $LED_2$, provided to represent the corresponding broadcasting modes, are connected to the microprocessor 16.

An on-screen-display (OSD) block 17, connected to the microprocessor 16, receives predetermined data DAT from the microprocessor 16 and generates a signal OSD for displaying on screen the received data DAT. The data DAT includes various information to be displayed on the screen, such as position information, broadcasting mode information, channel information, etc. A mixer 60 mixes the output signal from the switching portion 50 and the output signal OSD from the OSD block 17.

The mode converter 30 comprises a high definition signal generator 31 for receiving the output signal conventional signal from the first demodulator 12 and converting the received output signal into an HDTV broadcasting mode. The converter 30 also includes a data restorage portion 32 for receiving the output signal (HDTV) of the second demodulator 13 and data-restoring the output signal. Further subsystems of the converter 30 include digital-to-analog converters 33 and 34 that convert the output signals from the high definition signal generator 31 and the data restorage portion 32, respectively, into analog signals and a second switch 35 for switching between the two types of converted analog video signals. The switch 35 is controlled by mode signals $HD/\overline{CH}$ supplied from the microprocessor 16.

The recording block 20 comprises a first switch 21 for selectively outputting the output signals from the second demodulator 13 and the signal generator 31 under the control of the mode switching signal $HD/\overline{CH}$ supplied from the microprocessor 16. It further includes an adder 23 that adds the mode identification signal $S_{ID}$ supplied from microprocessor 16 to the signal output by the first switch 21 and a recording amplifier 22, which amplifies the added signal.

Figure 1B:
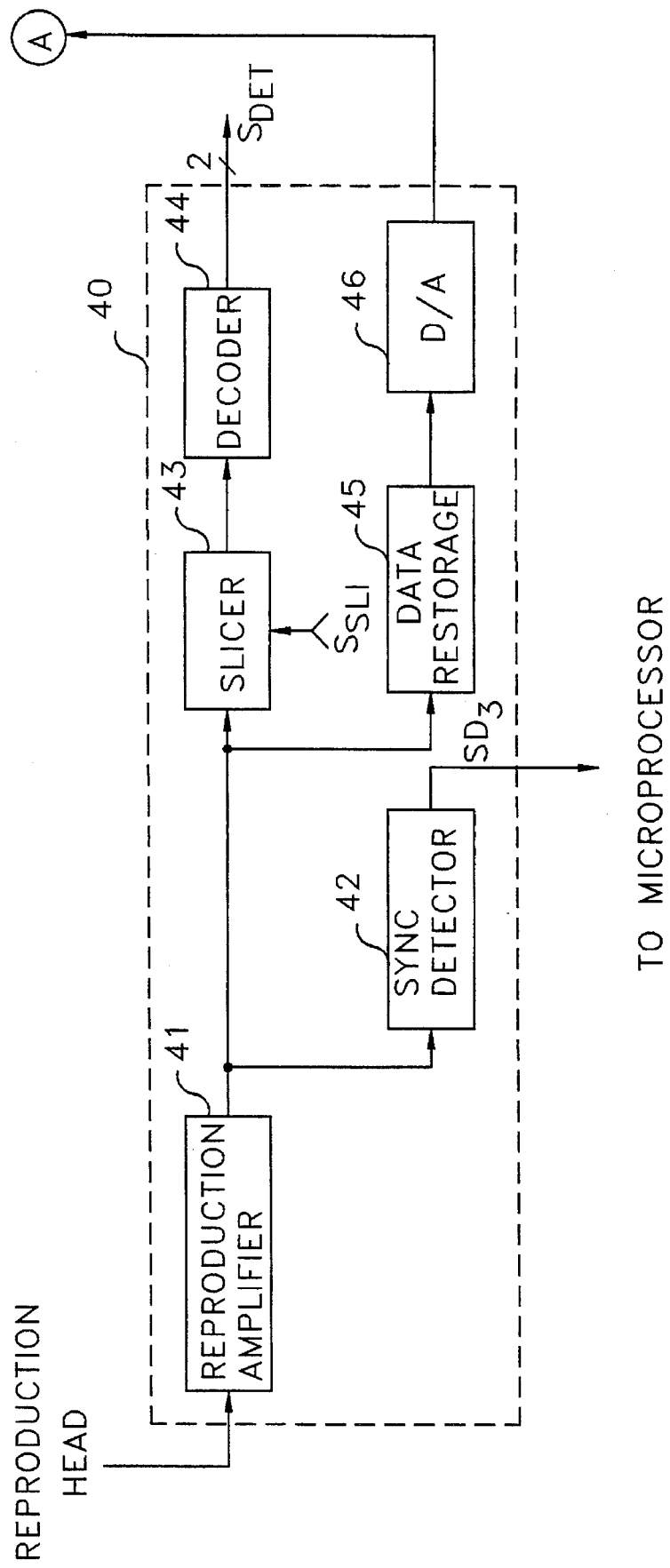

The reproducing and detecting portion 40 shown in FIG. 1B has a reproduction amplifier 41 that amplifies the video signal which is read by a reproduction head. It further includes a sync detector 42 that detects a sync signal in the amplified signal. The portion 40 also includes a slicer 43 for capturing the broadcasting identification information $S_{ID}$, inserted during the recording operation, from the amplified signal and a decoder 44 arranged to receive the output signal of the slicer 43 and detect the broadcasting identification information therefrom. Further, the portion 40 includes a data restorage portion 45 that performs a data-restoring operation on the amplified signal, along with digital-to-analog converter 46 that converts the restored data into an analog video signal.

The microprocessor 16 is controlled by an output signal $S_{key}$ of a remote controller 70, which can select a channel and select operating modes PB/$\overline{EE}$. The microprocessor 16 selects a channel via the tuner 11 according to a channel selection signal (not shown) transmitted from the remote controller 70 to the microprocessor 16. The video signal of the channel selected by the tuner 11 is supplied to the demodulators 12 and 13. If the video signal supplied from tuner 11 is a conventional TV broadcasting mode signal, it is normally demodulated by the first demodulator 12. On the other hand, if the video signal is an HDTV broadcasting mode signal, it is normally demodulated by second demodulator 13. Accordingly, if the reception channel is a conventional TV broadcasting mode channel, the first sync detector 14 detects the sync signals $SD_1$ in the demodulated signal supplied from the first demodulator 12. If, however, the reception channel is an HDTV broadcasting mode channel, the second sync detector 15 detects sync signals $SD_2$ in the demodulated signal supplied from second demodulator 13.

Figure 2:
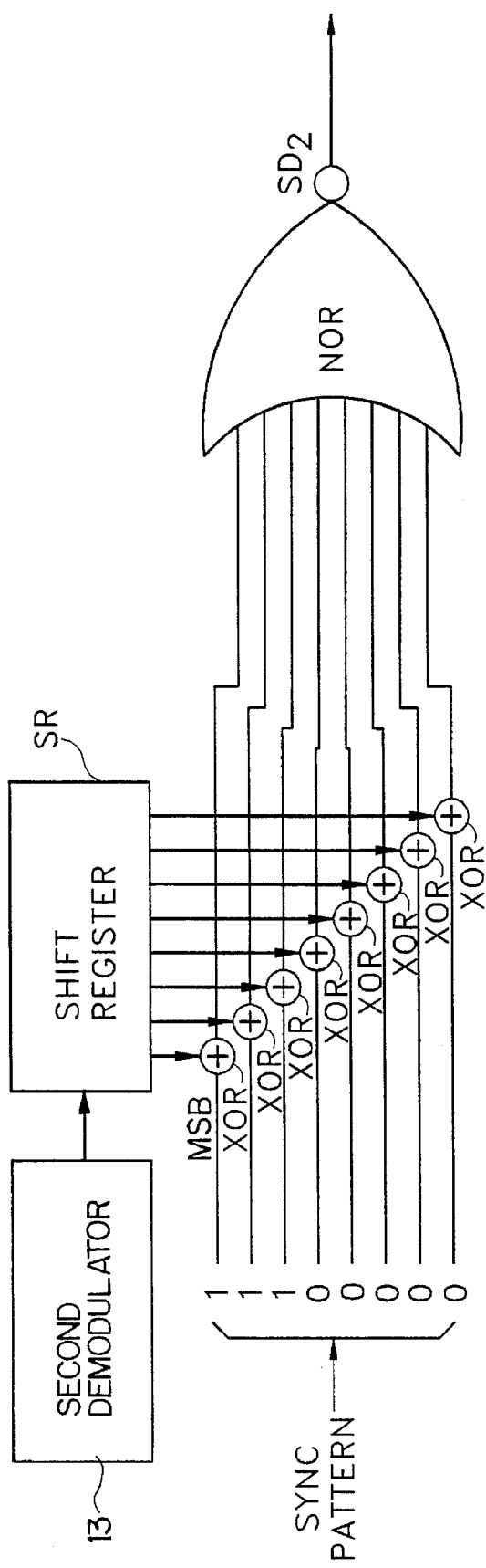
FIG. 2 is a detailed circuit diagram of the second sync detector shown in FIG. 1

FIG. 2 is a circuit diagram showing the second sync detector 15 of FIG. 1. Particularly, FIG. 2 illustrates a situation in which eight bits "11100000" are used as a sync pattern. In FIG. 2, a video signal in the HDTV broadcasting mode, having a data bit train pattern and demodulated by the second demodulator 13, is supplied to a shift register SR. The data bit train stored in the shift register SR and the data representing a particular sync pattern are exclusive-OR operated for each bit by the exclusive-OR gates XOR. The result values of the respective operations are then NOR-operated by a NOR gate. If the bit train of the data stored in shift register SR has the same value as the particular sync pattern, the result value which is obtained by logically operating upon the bit train of both data sets, first via the exclusive-OR gates and then via the NOR gate becomes "1". If the result value is "1", the second sync detector 15 outputs the data stored in shift register SR as the sync signal $SD_2$.

In such a manner, the sync detection signal generated from the first sync detector 14 or the second sync detector 15 is input into the microprocessor 16. The microprocessor 16 detects the input sync signal $SD_1$ or $SD_2$ and operates the light emitting diode $LED_1$ or $LED_2$ representing the corresponding broadcasting mode. Also, the microprocessor 16 generates the data DAT representing the broadcasting information and the channel information. It further generates a clock CLK and an enable signal $\overline{CE}$. All three signals DAT, CLK and $\overline{CE}$ are supplied to the on-screen-display (OSD) block 17.

If the broadcasting signal of the selected channel is a conventional TV broadcasting mode signal, the output signal of the first demodulator 12 is converted into an HDTV broadcasting mode video signal by the HDTV signal generator 31 in the mode converter 30. The thus-converted broadcasting signal is supplied to the first switch 21 and to the digital-to-analog converter 33. The first switch 21 is controlled by the mode switching signal $\overline{CH}$ supplied from microprocessor 16 in response to detected sync signal $SD_1$. As a result, the video signal supplied from the HDTV signal generator 31 is supplied to the adder 23. The adder 23 adds the mode identification signal $S_{ID}$ supplied from microprocessor 16 to a specific portion of the video signal supplied from the first switch 21. The resulting video signal output from the adder 23 is amplified by the recording amplifier 22 and is recorded by a recording head (not shown). The video signal which is converted into the HDTV broadcasting mode by the HDTV signal generator 31 is also converted into an analog signal by the digital-to-analog converter 33.

If the video signal of the selected channel is an HDTV broadcasting mode signal, the HDTV broadcasting mode signal that is demodulated by the second demodulator 13 is not converted by the HDTV generator 31 but rather is supplied to recording block 20 as it is, given the large amount of the compressed data. Here, the second switch 35 is controlled by the mode switching signal HD in correspondence to the sync signal $SD_2$ detected from the received video signal. The recording block 20 adds the mode identification $S_{ID}$, generated by the microprocessor 16 in response to the sync signal $SD_2$, to a specific portion of the output signal output by the second demodulator 13 via the adder 23. The block 20 then amplifies and outputs the added result via the recording amplifier 22. The amplified video signal is recorded via the recording head.

At the same time with the recording operation, the output signal of second demodulator 13 is applied to the data restorage portion 32 in the mode converter 30 to be data-restored. The restored data is then converted into an analog video signal by the digital-to-analog converter 34. The video signals supplied from the digital-to-analog converters 33 and 34 are controlled by the second switch 35, which receives the mode switching signal HD/$\overline{CH}$ corresponding to the broadcasting mode detected from the received video signal. The HDTV broadcasting mode video signal passing through second switch 35 is supplied to one input of the switching portion 50. The switching portion 50 supplies the output video signal supplied from the mode converter 30 to a mixer 60 in accordance with the simultaneous-recordable reproduction mode signal $\overline{EE}$.

The OSD block 17 generates an OSD signal for controlling the broadcasting mode information and the channel information that corresponds to the data DAT applied from microprocessor 16 and that is to be displayed using the OSD method of the present invention. The mixer 60 mixes the signals supplied from switching portion 50 and the OSD block 17 and outputs the mixed signal. Thus, the OSD character composed of the received channel and the broadcasting mode of the received channel are displayed on a display as shown in FIGS. 3A and 3B.

Figure 3B:
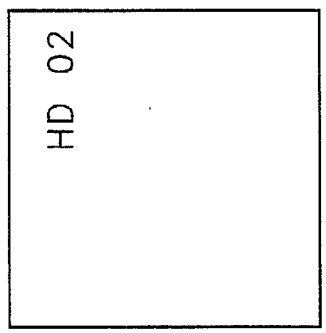
FIG. 3A and FIG. 3B represent the broadcasting channel name and the broadcasting mode name which are respectively displayed on a screen according to the present invention.
Figure 3A:
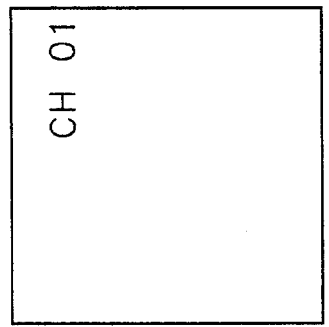

FIGS. 3A and 3B show the channel name and the mode name displayed on the screen according to the present invention. FIG. 3A shows the channel name displayed on the screen by the OSD block 17 of FIG. 1 when the received channel is in the conventional TV broadcasting mode. FIG. 3B shows the broadcasting mode name displayed on the screen by the OSD block 17 of FIG. 1 when the received channel is in the HDTV broadcasting mode.

If the reproduction mode (PB) is selected such that the video signal read from the reproduction head is input to the reproduction amplifier 41, the input video signal is amplified in reproduction amplifier 41. The amplified video signal is input to the sync detector 42, the data restorage portion 45 and the slicer 43. The sync detector 42 captures the sync signal $SD_3$ from the reproduction signal and applies the sync signal to the microprocessor 16. The microprocessor 16 thereupon supplies a slicing interval signal $S_{SLI}$ to the slicer 43 in response to the applied sync signal $SD_3$. The slicer 43 detects a predetermined portion of the applied reproduction signal in which the mode identification signal $S_{ID}$ added during the recording operation is located, by using the slicing the interval signal $S_{SLI}$. The decoder 44 decodes the output signal of the slicer 43, and determines the value of the added mode identification signal $S_{ID}$.

When the microprocessor 16 receives the detected mode identification signal $S_{DET}$, it forces the light emitting diode for the corresponding broadcasting mode display into an "ON" state, and supplies a signal representing the data DAT broadcasting mode to the OSD block 17. The data restored by the data restorage portion 45 is supplied to the digital-to-analog converter 46. The digital-to-analog converter 46 converts the data into an analog signal. Then, the switching portion 50 selectively outputs the signals output by the reproduction and detection portion 40 in accordance with the control signal PB supplied from microprocessor 16. The mixer 60 then outputs a video signal $V_o$, which is obtained by mixing the signal OSD output from OSD block 17 and the video signal supplied from the switching portion 50. Thus, the video signal displayed on the screen includes the OSD character in which the broadcasting mode only is represented.

Figure 4A:
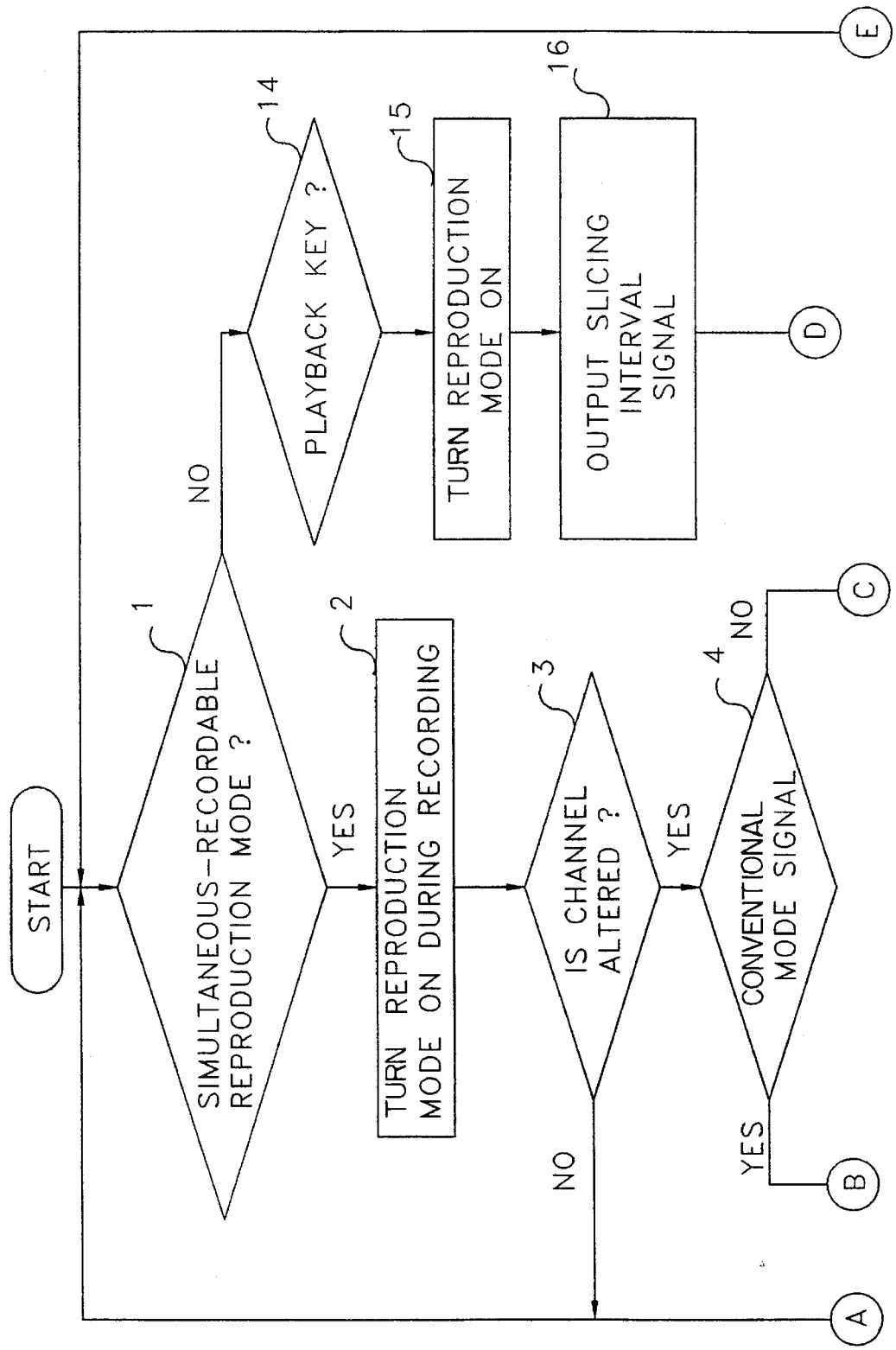
FIG. 4 is a flowchart diagram for explaining the operation of the microprocessor of FIG. 1 and is subdivided into FIG. 4A and FIG. 4B.

FIG. 4 illustrates the signal processing performed by the microprocessor 16 in response to manipulation by signals supplied through external keys such as the remote controller 70 of FIG. 1. In FIG. 4, the microprocessor 16 determines whether the signal applied via the remote controller 70 is the simultaneous-recordable reproduction signal $\overline{EE}$ in step 1. If the signal is the simultaneous-recordable reproduction signal, the video cassette recorder (VCR) is set to a simultaneous-recordable reproduction mode in step 2. Then, the microprocessor 16 checks if the current channel is altered in step 3. If the channel is not altered, the program returns to the input judging step 1 of the simultaneous-recordable reproduction signal. If the channel is altered, the microprocessor 16 checks if the broadcasting mode is the conventional TV broadcasting mode in step 4. If the broadcasting signal of the current channel is a conventional TV broadcasting mode signal, the microprocessor 16 supplies a mode identification signal "01" ($S_{ID}$) to be added to a predetermined portion of the recording signal by the adder 23 in step 5. Then, the broadcasting mode is set to the conventional TV broadcasting mode in step 6. In step 7, the light emitting diode $LED_1$ representing the conventional TV broadcasting mode signal is placed in the "ON" state. As shown in FIG. 3A, the conventional TV broadcasting channel is displayed in step 8, and processing is returned to step 1 for determining if the input signal is in the simultaneous-recordable reproduction mode.

If the video signal is not in the conventional TV broadcasting mode, it is determined whether the input-signal is in the HDTV broadcasting mode in step 9. If the current channel is not an HDTV broadcasting mode signal either, that is, in case the channel does not correspond to a broadcast station, the program returns to step 1 for determining whether the input signal is in the simultaneous-recordable reproduction mode. If, on the other hand, the current signal is an HDTV broadcasting mode signal, a mode identification signal "10" ($S_{ID}$) is added to a predetermined portion of the recording signal in step 10. Then, the broadcasting mode is set to the HDTV broadcasting mode in step 11. Thereafter, the light emitting diode LED$_2$ representing the HDTV broadcasting mode is turned "ON" in step 12, and the HDTV broadcasting mode channel name is displayed on the OSD as shown in FIG. 3B.

If the signal applied by the remote controller 70 is not a simultaneous-recordable reproduction mode signal, the microprocessor 16 checks in step 14 if the signal is a playback key signal for reproducing the recorded signal. If the playback key signal is detected, the system operation mode is set to the reproduction mode in step 15, and a control signal (PB) is generated for reading the video signal recorded together with the broadcasting mode information from the recording medium. Then, the slicing interval signal $S_{SLI}$ corresponding to the sync signal (SD$_3$) detected by the sync detector 42 is supplied to the slicer 43 in step 16. In step 17, it is checked if the signal output from the decoder 44 is the mode identification signal "01," ($S_{DET}$). If the mode identification signal is "01," that is, if the reproduction signal is the signal signifying the conventional TV broadcasting mode, the light emitting diode LED$_1$ for the conventional TV broadcasting mode display is turned "ON" in step 7. Then, the current channel name is displayed together with the conventional TV broadcasting mode on the OSD screen in step 8. If the read mode identification signal in not "01," it is checked if the mode identification signal ($S_{DET}$) is "10" in step 18. If the mode identification signal is "10," that is if the reproduction signal is an HDTV broadcasting mode signal, the light emitting diode LED$_2$ for the HDTV broadcasting mode display set to the "ON" state in step 12. The current channel name is displayed together with the HDTV broadcasting mode designation in step 13.

As described above, the broadcasting mode designation displaying apparatus according to the present invention can display whether the currently received channel broadcasting mode is the HDTV broadcasting mode or the more conventional broadcasting mode. Accordingly, the user can easily select the channel. Further, when the broadcasting signal is recorded using a VCR in conjunction with a TV, the user can ascertain the broadcasting mode of the reproduced video during playback.

As described above, the present invention has been described with reference to particular embodiments. However, a variety of modifications and applications will be apparent to persons skilled in the art. Any such modifications or applications should be deemed included within the scope of the invention, which is defined by the claims appended hereto.

What is claimed is:

1. An apparatus for displaying a broadcasting mode designation for use in a video device for displaying a video signal of a high definition television broadcasting mode and another video signal of a further television broadcasting mode, both of which are input through reception channels, said apparatus comprising:

detection means for detecting a mode identification signal signifying whether an input video signal is in the high definition television broadcasting mode or in the further television broadcasting mode;

mode conversion means for converting the input video signal into a display video signal to be displayed on a screen;

display means for displaying the display video signal output from said mode conversion means; and processing means for processing the mode identification signal detected by the detection means and for controlling said display means to display the mode designation in correspondence with the broadcasting mode of the video signal displayed on said display means.

2. An apparatus according to claim 1, wherein said processing means comprises two light emitting diodes for representing, respectively, the high definition television broadcasting mode and the further television broadcasting mode.

3. An apparatus according to claim 1, wherein said processing means comprises an on-screen display signal generator for generating an OSD signal representing the mode identification signal detected by said detection means, and a mixer for mixing the display video signal from said mode conversion means and the OSD signal from said on-screen display signal generator and supplying the mixed signal to said display means.

4. An apparatus according to claim 1, wherein said detection means comprises a first sync detector for detecting a sync signal indicative of the further television broadcasting mode from the input video signal, and a second sync detector for detecting a sync signal indicative of the high definition television broadcasting mode from the input video signal.

5. An apparatus according to claim 4, wherein said second sync detector comprises:

a shift register that receives the video signal in the high definition television broadcasting mode as a pattern of a data bit train and that stores the received video signal;

a plurality of exclusive-OR gates that perform logic operations on respective bits of the data bit train stored in said shift register and respective bits of a predetermined sync pattern, in units of corresponding bits, to provide output values; and a NOR gate that performs logic operations on the output values of said plurality of exclusive-OR gates and outputs the sync signal indicative of the high definition television broadcasting mode.

6. An apparatus according to claim 4, wherein, if the video signal output from said detection means is in the further television broadcasting mode, said mode conversion means converts the video signal output from said detection means into the high definition television broadcasting mode and outputs the converted signal as the display video signal, and, if the video signal output from said detection means is in the high definition from television broadcasting mode, said mode conversion means outputs an unconverted signal as the display signal.

7. An apparatus according to claim 6, wherein said processing means comprises an on-screen display signal generator for generating an OSD signal representing the mode identification signal detected by said detection means, and a mixer for mixing the display video signal from said mode conversion means and the OSD signal from said on-screen display signal generator and supplying the mixed signal to said display means.

8. An apparatus for displaying a broadcasting mode designation for use in a video device for recording and reproducing a video signal of a high definition television broadcasting mode and another video signal of a further television broadcasting mode, both of which are input through reception channels, said apparatus comprising:

first detection means for detecting a mode designator signal signifying whether an input video signal is in the high definition television broadcasting mode or in the further television broadcasting mode;

mode conversion means for converting the input video signal into a processed video signal;

recording means for receiving the processed video signal from said mode conversion means and for recording the received video signal, together with the mode designation signal detected by said first detection means, onto a recording medium;

reproduction means for reading the recorded video signal from the recording medium;

second detection means for detecting the mode designation signal from the read video signal;

switching means for receiving the processed video signal and the read video signal from said mode conversion means and said reproduction means, respectively, and selectively outputting a selected one of the processed and the read video signal, wherein the selection by said switching means is governed by a reception mode signal and a reproduction mode signal;

display means for displaying the selected video signal output from said switching means;

a microprocessor for generating a control signal controlling display of the mode designation signal detected by said first and second detection means on said display means in correspondence with the selected video signal currently displayed on said display means; and processing means for receiving the control signal and processing and displaying the detected mode designation signal on said display means in accordance with the control signal.

9. An apparatus according to claim 8, wherein said processing means comprises an on-screen display signal generator for generating an OSD signal upon receiving the control signal, and a mixer for mixing the selected video signal from said switching means and the OSD signal from said on-screen display signal generator and for supplying the mixed signal to said display means.

10. An apparatus according to claim 8, wherein said processing means comprises two light emitting diodes for representing, respectively, the high definition television broadcasting mode and the further television broadcasting mode.

11. An apparatus according to claim 8, wherein, if the input video signal output from said first detection means is in the further television TV broadcasting mode, said mode conversion means converts the video signal output from said detection means into the high definition television broadcasting mode and outputs the converted signal as the processed signal while, if the input video signal is in the high definition television broadcasting mode, said mode conversion means outputs an unconverted signal as the processed signal.

12. An apparatus according to claim 11, wherein said processing means comprises an on-screen display signal generator for generating an OSD signal representing the mode identification signal detected by said first detection means, and mixer for mixing the selected video signal from said switching means and the OSD signal from said on-screen display signal generator and for supplying the mixed signal to said display means.

13. An apparatus according to claim 8, wherein said second detection means comprises a sync detector for detecting a sync signal from the read video signal from the reproduction means and a mode designation signal detector for detecting the mode designation signal from the read video signal.

14. An apparatus for generating and displaying a broadcasting mode designation signal for use in a video device, wherein the video device displays a video signal of a high definition broadcasting mode and another video signal of an alternative broadcasting mode, said apparatus comprising:

a mode detector comprising
an input for an input video signal from a selected channel, and
a detector that captures and outputs identification signals from the input video signal, wherein the identification signals identify the input video signal as being in either the high definition broadcasting mode or in the alternative broadcasting mode;

a mode converter, connected with said mode detector, comprising
a mode processor that receives and processes the input video signal in accordance with the broadcast mode of the input video signal to output a processed video signal, said mode processor including a high definition signal generator for converting video signals in the alternative broadcasting mode into high definition broadcasting mode video signals; and a signal processor, connected with said mode detector and said mode converter, said signal processor receiving the identification signals as an input and controlling said mode converter to process the input video signal in accordance with the identification signals received, said signal processor further generating the broadcasting mode designation signal in accordance with the identification signals received, and outputting the broadcasting mode designation signal to a display.

15. An apparatus according to claim 14, further comprising a recording portion arranged to receive and record onto a recording medium the input video signal and an identifier signal generated in accordance with the identification signals;

a playback portion arranged to read the recorded video signal and the identifier signal from the recording medium, to decode the identifier signal, and to output the read video signal.

16. An apparatus according to claim 14, further comprising a mixer that mixes the processed video signal and the broadcasting mode designation signal and outputs a combined signal capable of being displayed on a video display.

17. An apparatus according to claim 15, further comprising a switch arranged to select either the processed video signal or the read video signal and to output the selected signal; and a mixer that mixes the selected signal and the broadcasting mode designation signal and outputs a combined signal capable of being displayed on a video display.

\* \* \* \* \*